US006437930B1

(12) United States Patent
Liu et al.

(10) Patent No.: US 6,437,930 B1
(45) Date of Patent: Aug. 20, 2002

(54) METHOD OF ESTIMATING THE CLEARANCE BETWEEN A READ/WRITE TRANSDUCER HEAD AND A MAGNETIC RECORDING MEDIUM

(75) Inventors: Bo Liu; Shengbin Hu, both of Singapore (SG)

(73) Assignee: C/O Data Storage Institute, Singapore (SG)

( * ) Notice: Subject to any disclaimer, the term of this patent is extended or adjusted under 35 U.S.C. 154(b) by 0 days.

(21) Appl. No.: 09/422,129

(22) Filed: Oct. 20, 1999

(30) Foreign Application Priority Data

Mar. 4, 1999 (SG) .......................................... 9901294-0

(51) Int. Cl.[7] .............................................. G11B 27/36
(52) U.S. Cl. ........................................ 360/25; 360/75
(58) Field of Search .............................. 360/25, 75, 31, 360/77.08

(56) References Cited

U.S. PATENT DOCUMENTS

| 4,222,081 A | * | 9/1980 | Kamo et al. .................. 360/67 |
| 5,909,330 A | * | 6/1999 | Carlson et al. ............... 360/31 |
| 6,014,282 A | * | 1/2000 | Ito .............................. 360/75 |

* cited by examiner

*Primary Examiner*—David Hudspeth
*Assistant Examiner*—Varsha A. Kapadia
(74) *Attorney, Agent, or Firm*—Jenkens & Gilchrist, P.C.

(57) ABSTRACT

A method and apparatus of detecting variations in a clearance distance between a magnetic read/write transducer and a magnetic recording disk having a clearance detection burst recorded thereon. The clearance detection burst has at least two groups of bit patterns each having different transition densities. The method may have the steps of obtaining a readback signal from the at least two groups of bit patterns, the readback signal being sensitive to variations in the clearance; detecting the amplitude of the readback signal of a first group. The amplitudes of the readback signals are detected and then compared to provide an indication of a variation in the clearance.

19 Claims, 4 Drawing Sheets

Track format (10)

Servo-sector format (11)

METHOD OF ESTIMATING THE CLEARANCE BETWEEN A READ/WRITE TRANSDUCER HEAD AND A MAGNETIC RECORDING MEDIUM

BACKGROUND OF THE INVENTION

1. Field of the Invention

This invention relates to A method of estimating the clearance distance between a magnetic read/write transducer and a magnetic recording disk.

2. Description of Related Art

In data storage devices such as magnetic disk drives, both hard and floppy, and in tape storage systems, the magnetic transducer head is positioned over the magnetic medium whilst data is read from or written onto the magnetic medium. Higher recording densities are obtainable by reducing the clearance between the magnetic transducer head and the magnetic medium. Magnetic recording technologies are achieving data storage densities in they region of 1 $Gb/in^2$ and greater. However, with such high recording densities, it is difficult to maintain the low constant clearance required between the magnetic head and the magnetic disk.

Generally, a typical disk in a disk drive comprises a substrate, an underlayer, a layer of magnetic medium, a protective layer, and a layer of lubricant which comprises the effective surface of the disk. The tern head-disk clearance is the distance between a magnetic transducer head and a magnetic disk.

The phenomena of contamination build-up was not as serious as it is now because the head-disk clearance was in the region of 100 nm or greater, and a build-up of contamination on the transducer head did not affect the head-disk clearance significantly. Forehead-disk clearances in the "near contact region" where the magnetic read/write transducer has a chance of contacting the disk surface, the clearance between the magnetic read/write transducer and the magnetic disk is in the region of 15 to 40 nm. At such a small head-disk clearance, the chance of the lubricant portion of the disk coming into contact with the surface of a slider or being transferred from the disk surface to the slider increases significantly. It has been found that contaminant on the transducer can be as thick as 30 nm or more. Such build-up requires an increased head-disk clearance and as a result, the read/write performance will be degraded. Since disk drives are now being routinely manufactured to operate with the head-disk clearance within the near-contact region, there is a need for a method of estimating the variation of the clearance between the magnetic read/write transducer and the magnetic disk so that variations on the disk surface due to contaminant build-up, which could result in excessive degradation of the recording performance, can be detected so that start/stop operations can be initiated to remove or reduce the contamination build-up.

A number of methods are known for measuring the clearance between magnetic read/write transducers and a magnetic recording medium. For example, U.S. Pat. No. 4,872,071 describes a method and apparatus of detecting abnormal operation of a magnetic disk drive by reading data from a pre-determined area of each track. The amplitude of the readback signals from each track are compared with a corresponding reference level. If the comparison indicates that the variation in the clearance is above a predetermined level, then an alarm signal is provided so that necessary actions can be taken to avoid the possibility, of a head crash. However, this method does not take into account that the amplitude of the readback signals varies when the magnetic head slider is not located perfectly along the center line of a track.

U.S. Pat. No. 4,777,544 describes a method and apparatus of the in-situ measurement of the clearance between a magnetic read/write transducer and a magnetic medium. A pre-written signal located at a predetermined area of the magnetic recording medium is readback at two different clearance levels. The Wallance Equation is used to measure the variation of the clearance. In a further embodiment, a signal is recorded which has a spectral content comprising a plurality of different frequencies, and readback signals are simultaneously sensed at two separate wavelengths. A drawback of this method is that it is not convenient for measuring the variation of clearance between a magnetic read/write trasducer and a magnetic disk during normal data read/write operations.

U.S. Pat. No. 5,130,866 describes a method and circuitry for in-situ measurement of a magnetic read/write transducer and a magnetic medium clearance. Isolated transitions are pre-written on a magnetic medium. During a readout process, the width of a readout signal of an isolated transition increases as the clearance increases. The pulse width is measured during a reading operation and is used to indicate the in-situ variation of clearance. However, a drawback of this method is that the electronics required to implement this method are quite complicated compared with the read channel of present disk drives and are not easy to build into a disk drive system.

SUMMARY OF THE INVENTION

It is an object of the present invention to provide a simple in-situ method for detecting variations in the clearance between a magnetic read/write transducer and a magnetic recording disk in an operational magnetic disk drive or tape storage system.

Accordingly, the present invention provides a method of detecting variations in a clearance distance between a magnetic read/write transducer and a magnetic recording medium having a clearance detection burst recorded thereon, the clearance detection burst comprises at least two groups of bit patterns having different transition densities, the method comprises the steps of: obtaining a readback signal from the at least two groups of bit patterns, the readback signal being sensitive to variations in the clearance; detecting the amplitude of the readback signal of a first group; detecting the amplitude of the readback signal of a second group; comparing the amplitudes of the readback signals from the at least two groups of bit patterns to provide an indication of a variation in the clearance.

BRIEF DESCRIPTION OF THE DRAWINGS

In order that the present invention may be more readily understood, embodiments thereof will now be described, by way of example, with reference to the accompanying drawings, in which.

DETAILED DESCRIPTION OF THE PRESENTLY PREFERRED EXEMPLARY EMBODIMENTS

Specific reference is made in the following description to a magnetic disk drive system. However, it is to be appreciated that the present invention is applicable to other forms of magnetic recording media such as both hard and floppy magnetic disk drives and tape storage systems.

Figure 1:
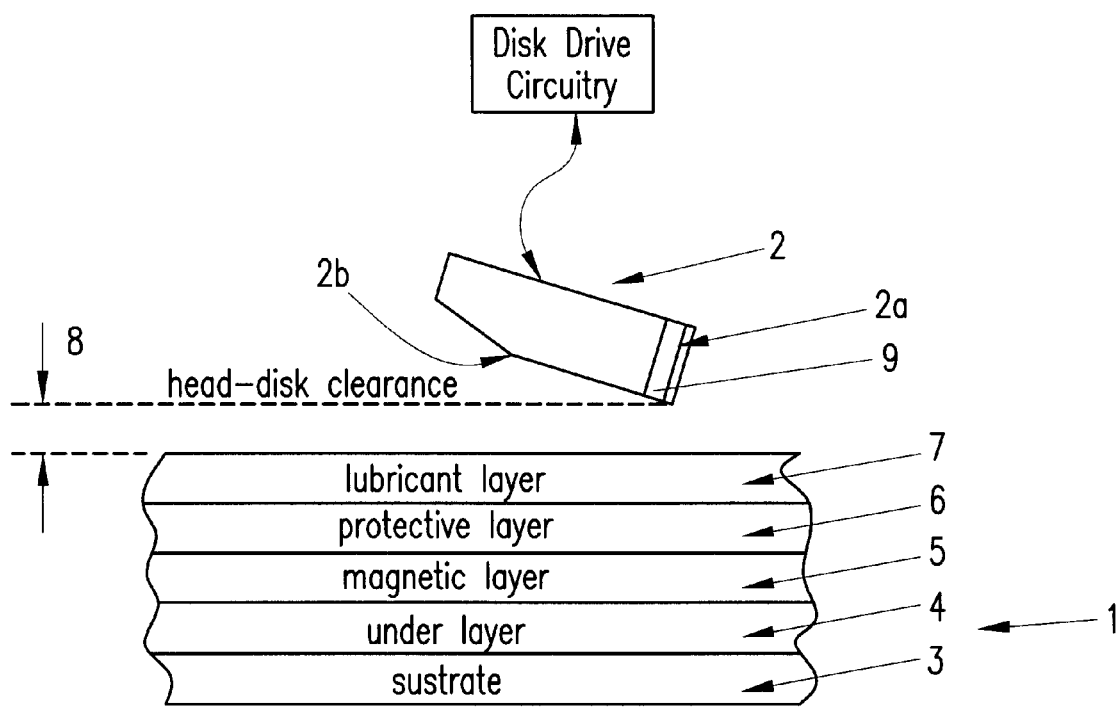
FIG. 1 is a schematic diagram of a magnetic read/write transducer positioned above a disk incorporating a magnetic recording medium.

FIG. 1 shows part of the structure of a magnetic disk drive system and, in particular, a part of a disk 1 and a slider 2 having a transducer 2a. In operation, the slider 2 flies above the surface of the rotating disk 1 upon an air being created by, the high relative speed between an air bearing surface of the slider 2b and the disk 1. The distance by which -the transducer 2a is spaced apart from the surface of the disk 1 is termed the head-disk clearance 8.

The disk structure comprises a disk substrate 3, an underlayer 4 laid over the substrate 3, a magnetic layer 5, a protective layer 6 laid over the magnetic recording medium 5, and a lubricant layer 7.

The slider 2 supports the magnetic transducer 2a which is connected to, for example, the disk drive circuitry 20. The magnetic transducer 2a is for reading and -writing data from and onto the magnetic recording layer 5. As the disk 1 rotates with respect to the slider 2, contaminants such as debris and lubricant build-up on the underside of the slider 2. Such build-up of contaminant particles 9 can cause significant changes in the clearance 8 between the -magnetic transducer 2a and the magnetic disk. 1. This problem is exacerbated for clearances 8 below 50 nm which are necessary to achieve high magnetic recording densities above 1 Gb/in$^2$.

Previous disk drive systems did not encounter this problem because the clearance 8 was significantly greater than the layer of contamination so the build-up of contaminant particles 9 did not result in significant changes in the clearance. The effect of such contaminant build-up only had a negligible effect on the read/write performance of this system. However, it has been discovered that contaminant build-up 9 on more advanced disk drive systems having a clearance 8 below 50 nm can be as thick as 30 nm or even more. This represents a significant portion of the clearance between the magnetic read/write transducer 2a and the magnetic disk 1 and will strongly affect the read/write performance and reliability of the disk drive system.

Figure 2:
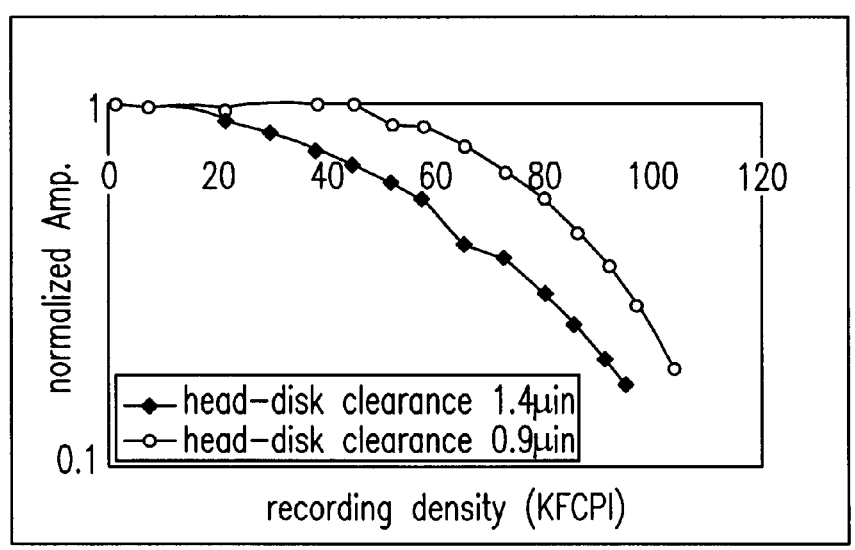
FIG. 2 is a graph illustrating the relationship between normalized readback amplitude as a function of recording density for a low and a high head-disk clearance.

FIG. 2 shows the relationship between normalized readback amplitude as a function of recording density for a low head-disk clearance (0.9 microinch) and a high head-medium clearance (1.4 micrbinch).

Referring to FIG. 2, the horizontal axis represents the recording density or transition density in units of thousands of flux changes per inch ("KFCPI") and the vertical axis represents the readback amplitude normalized at one thousand flux changes per inch. It can be seen that in the range of low recording densities less than 20 KFCPI, the normalized readback amplitude for the two head-disk clearances, 1.4 microinch and 0.9 microinch respectively, are almost the same. However, in the range of high recording densities, 80 KFCPI for example, there is a marked difference between the normalized readback amplitude for the lower head-medium clearance (0.9 microinch) and that of the higher head-medium clearance (1.4 microinch). Thus the difference of the normalized values with different transition densities can be used to present the relative change or variation in the head-disk clearance.

It is known that contamination build-up can be removed or partially removed through a number of start/stop operations.

It is, therefore, important that a detection system be provided which can detect those changes or variations in clearance, which could result from contaminant 9 being transferred to the slider 2, so that, if the variation in clearance is not within an acceptance range, operations, such as a number of contact start/stop operations, can be initiated to remove the contaminant build-up.

Figure 3:
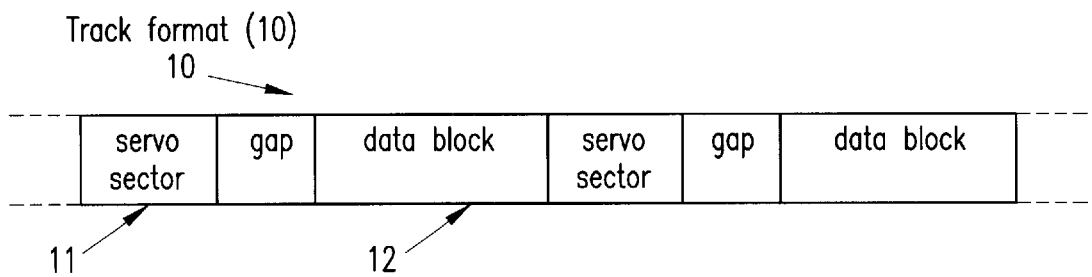
FIG. 3 is a schematic representation of one track on a disk which includes the servo sectors and data-blocks.
Figure 4:
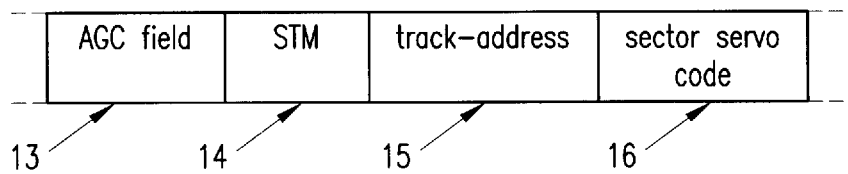
FIG. 4 is a schematic representation of the current arrangement in each servo sector and data-block.
Figure 5:
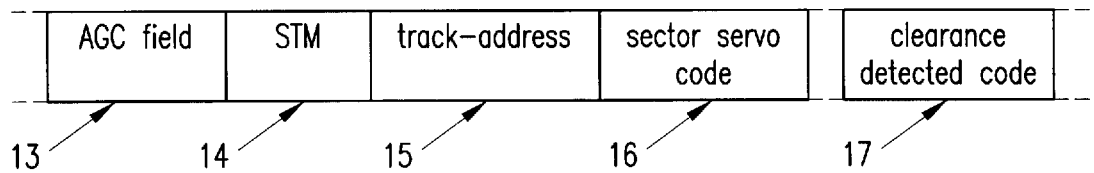
FIG. 5 is a schematic representation of a servo sector embodying the present invention, with a clearance detection burst inserted.

Referring to FIG. 3, the magnetic recording layer 5 of the disk 1 is divided into a number of concentric tracks 10, each track 10 being divided into a number of servo sectors 11 and data-blocks 12 as shown in FIG. 3. A schematic map of a conventional servo section 11 is shown in FIG. 4. A conventional servo sector 11 comprises four field patterns: an automatic gain control ("AGC") field 13; a servo timing mark ("STM") or synchronization pattern 14; an address mark 15; and a sector servo burst 16. A servo sector 11 for use with an exemplary method embodying the present invention is shown in FIG. 5 and is similar to a conventional servo sector 11, but includes an additional field 17 located after the sector servo burst 16 and preceding the data block 12. The additional field 17 comprises a so-called head-disk clearance detection burst or bit pattern. The clearance detection burst 17 is pre-written onto the magnetic recording medium simultaneously with the sector servo burst 16 and any other control information in the servo sector 11. Each servo sector 11 is not written over during normal read/write operations of the disk drive.

One exemplary preferred embodiment of a clearance detection burst or bit pattern is based on two groups of transitions, with one group having a low transition density (corresponding to the flat part of the curves in FIG. 2) and another group having a high transition density (corresponding to the falling part of the curves in FIG. 2). If there is no clearance change, the amplitude ratio (($A_{low}-A_{high})/A_{low}$) of the readback signals from the two groups will be the same, where $A_{high}$ is the amplitude of high transition density readback signals and $A_{low}$ is the amplitude of low transition density readback signals. Contamination build-up on the transducer surface will increase the head-disk clearance 8 and the amplitude ratio of two readback signals from the two transition groups will also increase. The amount of increase is proportional to the clearance 8 increase, as illustrated in FIG. 7 and can be used to detect the change in clearance 8.

Figure 6:
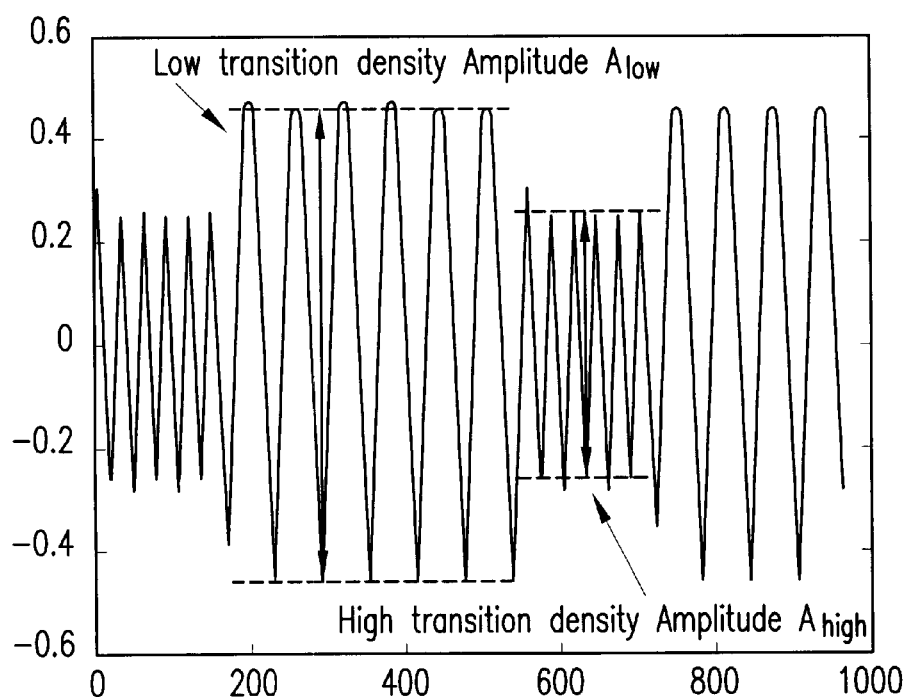
FIG. 6 is a graph illustrating the relationship between the amplitude of two readback signals from, respectively, a low transition density group and a high transition density group.

FIG. 6 gives an example of the amplitude relationship between two different transition density groups which are very sensitive to the variation of head-disk clearance 8.

Figure 7:
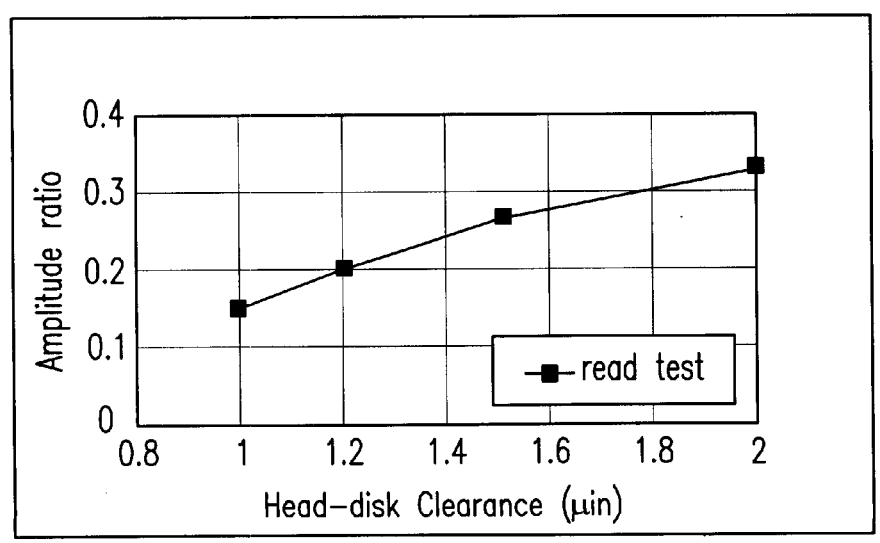
FIG. 7 is a graph showing the transition amplitude ratio as a function of the clearance between the magnetic transducer head and disk calculated by $(A_{low}-A_{high})/A_{low}$.

FIG. 7 shows the relationship between the head-disk clearance 8 and the amplitude ratio of the two transition groups. The amplitude ratio increases proportionally as the clearance increases. Therefore, the variation of amplitude ratio can be used to indicate the variation in the head-disk clearance 8.

If the clearance identified in the above manner is not within a predetermined acceptable range, then a control operation can be initiated to stop read/write operations and conduct one or more stop/start operations to remove accumulated contaminant particles from the air-bearing surface of the slider. The system would then return to the interrupted read/write operations.

A further embodiment of the method according to the present invention includes using a clearance detection burst incorporating three or more groups of transitions. From the readback signals from these three groups of transitions, similar techniques used with two groups of transitions can be used to estimate the variation of clearance between the slider 2 and the disk 1.

Figure 8:
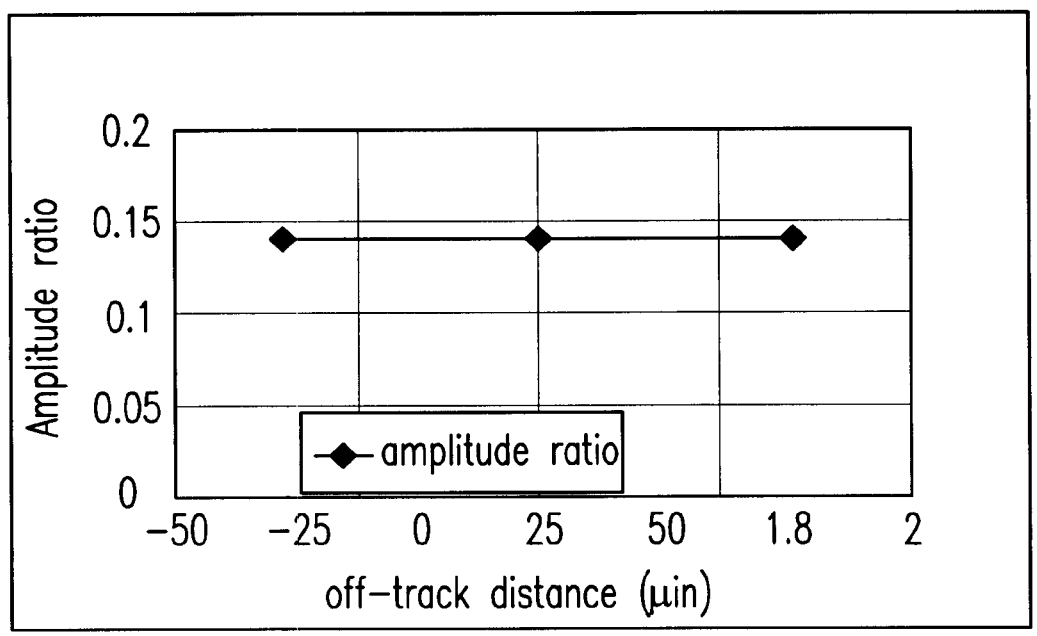
FIG. 8 is a graph illustrating the transition amplitude ratio as a function of off-track distance.

One advantage of this invention is that the ratio of two readback signals from the two transition groups is not sensitive to "off-track" variations of the magnetic transducer. Since the above prescribed method detects the relative variations in amplitudes of the readback signals from the clearance detection patterns, then the resulting ratio of variation of readback signals is not sensitive to the magnetic transducer 2a being slightly off the center line of a particular track. Thus, off-track distance is not a variable when detection of the variation of clearance is concerned. FIG. 8 shows the relationship between the off-track distance and the amplitude ratio. It can be seen that the ratio can be considered as a constant when the magnetic head is positioned at an offset above 10% of the track width.

The clearance detection bursts are pre-written in a conventional pre-writing operation thereby avoiding the need to re-write or erase this area of each sector during normal read/write, operations. But it is understood that the clearance detection bursts could be written when an area is re-written after an erase operation.

The present method can be based on existing circuitry and apparatus available in present disk drives. Thus, there is no need to incorporate a lot of additional electronic circuitry to identify the variations in the clearance between the magnetic head transducer 2a and the disk 1.

Although various preferred embodiments, of the invention have been shown and described, it will be appreciated by those skilled in the art that changes may be made to these embodiments without departing from the scope of which is defined in the appended claims.

What is claimed is:

1. A method of detecting variations in a clearance distance between a magnetic read/write transducer and a magnetic recording medium, said magnetic recording medium having a clearance detection burst recorded thereon, the clearance detection burst comprises at least two groups of bit patterns each having different transition densities, the method comprising the steps of:
    obtaining a readback signal from the at least two groups of bit patterns, the readback signal being sensitive to variations in said clearance distance;
    detecting a first amplitude (A1) of the readback signal of a first group of said at least two groups of bit patterns,
    detecting a second amplitude (A2) of the readback signal of a second group of said at least tow groups of bit patterns; and
    calculating a difference between the first and second amplitudes, (A1–A2), of the readback signals from the first and second groups; and
    dividing the calculated difference by the first amplitude such that the resultant amplitude change ratio, (A1–A2/A1), is indicative of the variation in the clearance distance.

2. The method of claim 1, wherein the clearance detection burst comprises three or more groups of bit patterns.

3. The method of claim 1, wherein the clearance detection burst is recorded in a control zone of a sector of the magnetic medium.

4. The method of claim 1, wherein the clearance detection burst is pre-recorded onto at least one predetermined area of the magnetic recording medium.

5. The method of claim 1, further comprising the step of generating a detection signal if the indicated variation in the clearance distance is greater than a predetermined threshold.

6. The method of claim 5, further comprising the step of terminating read/write operations and initiating a stop/start operation in order to remove contamination particles.

7. The method of claim 1, wherein said magnetic recording medium is divided into a plurality of sectors and wherein the clearance detection burst is located at substantially the beginning of at least one sector.

8. The method of claim 1, wherein said magnetic recording medium is divided into a plurality of sectors and wherein the clearance detection burst is located at substantially the end of at least one sector.

9. The method of claim 1, wherein said magnetic recording medium is divided into a plurality of sectors and wherein the clearance detection burst is located in substantially the same place within a plurality of sectors.

10. The method of claim 1, wherein said first group of bit patterns has a higher transition density than the second group of bit patterns.

11. The method of claim 1, wherein said first group of bit patterns has a lower transition density than the second group of bit patterns.

12. The method of claim 1, wherein said magnetic recording medium includes an additional field comprising a clearance detection burst or bit pattern.

13. The method of claim 1, wherein no clearance change occurs while said resultant readback amplitude change ratio is the same.

14. The method of claim 1, wherein the amount of increase of the readback amplitude change ratio of the readback signal from the at least two groups of bit patterns is proportional to the clearance.

15. The method of claim 1, wherein the relationship between the clearance and the readback amplitude change ratio can be used to detect the change in clearance.

16. An apparatus for detecting build-up of contamination particles on an air-bearing side of a magnetic read/write slider/transducer, said apparatus comprising:
    a slider, said slider comprising a magnetic read/write transducer and an air-bearing surface;
    a magnetic medium having a surface facing said magnetic read/write transducer;
    an air bearing created between said air-bearing surface of said slider and said magnetic medium when said magnetic medium is in motion;
    a plurality of sectors on said magnetic medium, each said sector having a predetermined format; and
    a clearance detection code positioned in at least one format of said plurality of sectors, said clearance detection code comprising:
        a first group of bit patterns having a first predetermined transition density; and
        at least a second group of bit patterns, said second group of bit patterns having a second predetermined transition density; said magnetic read/write transducer adapted to read a first amplitude (A1) from said first group of bit patterns and a second amplitude (A2) from said second group of bit patterns in order to facilitate a readback amplitude change ratio calculation, (A1−A2)/A1, for determining a change in clearance between said magnetic read/write transducer and said surface.

17. The apparatus of claim 16, A wherein said magnetic read/write transducer can read said clearance detection code such that an amplitude difference between a first read first group and a first read second group each having different transition densities, can be calculated, said apparatus further comprising:

means for detecting a first amplitude from said first read first group, means for detecting a second amplitude from said first read second group, and means for calculating a difference between said first and second amplitudes of said first and second group and dividing the calculated difference by said first amplitude to determine a ratio which provides an indication that particles have collected on the air-bearing surface.

18. The apparatus of claim 16, further comprising a hard disk drive.

19. The apparatus of claim 16, further comprising a floppy disk drive.

* * * * *

UNITED STATES PATENT AND TRADEMARK OFFICE
CERTIFICATE OF CORRECTION

PATENT NO.    : 6,437,930 B1
DATED         : August 20, 2002
INVENTOR(S)   : Liu et al.

It is certified that error appears in the above-identified patent and that said Letters Patent is hereby corrected as shown below:

Column 1,
Line 7, replace "A" with -- a --
Line 18, replace "they" with -- the --
Line 25, replace "tern" with -- term --
Line 32, replace "Forehead-disk" with -- For head-disk --

Column 3,
Line 59, replace "micrbinch" with -- microinch --

Column 4,
Between lines 56 & 57, add -- Each clearance detection burst 17 comprises a series of bits nominally divided into at least two groups. Each group can have a different transition density. --

Signed and Sealed this

Twelfth Day of August, 2003

JAMES E. ROGAN
*Director of the United States Patent and Trademark Office*